(12) United States Patent

Iwata (10) Patent No.: US 10,386,459 B2
(45) Date of Patent: Aug. 20, 2019

(54) ECHO IMAGE DISPLAY DEVICE (71) Applicant: FURUNO ELECTRIC CO., LTD., Nishinomiya, Hyogo (JP)

(72) Inventor: Kazunobu Iwata, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 301 days.

(21) Appl. No.: 15/441,321

(22) Filed: Feb. 24, 2017

(65) Prior Publication Data
US 2017/0248684 A1 Aug. 31, 2017

(30) Foreign Application Priority Data
Feb. 25, 2016 (JP) ................. 2016-034725

(51) Int. Cl.
G01S 7/04 (2006.01)

(52) U.S. Cl.
CPC ..................... G01S 7/04 (2013.01)

(58) Field of Classification Search
CPC ........ G01S 13/04; G01S 13/9307; G01S 7/02; G01S 7/04; G01S 7/2923; G01S 7/298
USPC ......................................... 342/179
See application file for complete search history.

(56) References Cited

U.S. PATENT DOCUMENTS

| | | | | |
|---|---|---|---|---|
| 5,519,401 A * | 5/1996 | Farmer | .................. | G01S 7/298 342/185 |
| 2009/0121923 A1* | 5/2009 | Mainds | .................. | G01S 7/298 342/185 |
| 2011/0102248 A1* | 5/2011 | Maeno | .................. | G01S 7/2927 342/179 |
| 2011/0205104 A1* | 8/2011 | Nakagawa | ................ | G01S 7/22 342/145 |
| 2012/0127018 A1* | 5/2012 | Nakagawa | ............... | G01S 13/04 342/90 |
| 2012/0127026 A1* | 5/2012 | Matsumoto | ............. | G01S 7/064 342/179 |
| 2013/0187806 A1* | 7/2013 | Takemoto | ............. | G01S 13/582 342/90 |
| 2013/0286022 A1* | 10/2013 | Kubota | ..................... | G01S 7/10 345/440 |

(Continued)

FOREIGN PATENT DOCUMENTS

JP 5416935 B2 2/2014

*Primary Examiner* — Timothy X Pham
(74) *Attorney, Agent, or Firm* — Studebaker & Brackett PC (57) ABSTRACT An echo image display device includes a receiver, an information memory, an intermediate image production component, and a display component. The receiver is configured to receive a reception signal that is a reflection of a transmitted signal. The information memory is configured to store detection information about the reception signal received by the receiver and position information about the reception signal in association with each other. The intermediate image production component is configured to produce an intermediate image based on at least the detection information for the reception signal at an N-th scan, and the detection information for the reception signal at an N−1-th scan having the same position information as the position information for the reception signal at the N-th scan. The display component is configured to display the intermediate image produced by the intermediate image production component.

20 Claims, 5 Drawing Sheets

(56) References Cited

U.S. PATENT DOCUMENTS

2015/0054672 A1\* 2/2015 Nakahama ............ G01S 7/2923
342/27

\* cited by examiner

FIG. 5 er is configured to receive a reception signal that is a reflection of a transmitted signal. The information memory is configured to store detection information about the reception signal received by the receiver and position information about the reception signal in association with each other. The intermediate image production component is configured to produce an intermediate image based on at least the detection information for the reception signal at an N-th scan, and the detection information for the reception signal at an N−1-th scan having the same position information as the position information for the reception signal at the N-th scan. The display component is configured to display the intermediate image produced by the intermediate image production component.

Consequently, an intermediate image is produced separately from the echo image produced based on the reception signals, which gives an echo image that fully reflects information about the detection object (detection region). Therefore, the above configuration allows a change in information about the detection object (detection region) to be expressed with an ample amount of information.

With the above-mentioned echo image display device, it is preferable if the display component is configured to display the intermediate image after displaying an echo image based on the reception signal at the N−1-th scan, and before displaying an echo image based on the reception signal at the N-th scan.

Consequently, a temporal change in information about the detection object (detection region) can be expressed without seeming odd.

With the above-mentioned echo image display device, it is preferable if the intermediate image production component is configured to produce the intermediate image by linear interpolation using the detection information for the reception signal at the N-th scan, and the detection information for the reception signal at the N−1-th scan having the same position information as the position information for the reception signal at the N-th scan.

Consequently, the process in which the echo image that is displayed changes from an echo image based on the reception signal for the N−1-th scan to an echo image based on the reception signal for the N-th scan can be reflected by the intermediate image that is produced. Also, the intermediate image can be produced by simple computation using linear interpolation.

With the above-mentioned echo image display device, it is preferable if the intermediate image production component is configured to produce the intermediate image by curve interpolation using at least the detection information for the reception signal at the N-th scan, the detection information for the reception signal at the N−1-th scan having the same position information as the position information for the reception signal at the N-th scan, and the detection information for the reception signal at the N−2-th scan having the same position information as the position information for the reception signal at the N-th scan.

In this case, the process of change in a plurality of echo images produced based on reception signals can be smoothly reflected. Specifically, the process of change in the detection object (detection region) can be expressed smoothly.

With the above-mentioned echo image display device, it is preferable if the intermediate image production component is configured to produce the intermediate image based on at least a motion vector estimating a motion of an image between an echo image produced based on the reception signal at the N-th scan and an echo image produced based on the reception signal at the N−1-th scan.

In this case, because an intermediate image is produced according to the motion vector interpolation method, the process of change in the detection object (detection region) can be expressed more naturally.

It is preferable if the above-mentioned echo image display device has the following configuration. Specifically, the information memory is configured to store the position information and the detection information for a specific detection region. The intermediate image production component is configured to produce the intermediate image for the detection region every time the entire detection region is scanned.

Consequently, the change in the echo image over a specific detection region can be continuously and smoothly displayed.

It is preferable if the above-mentioned echo image display device has the following configuration. Specifically, this echo image display device comprises an estimation component configured to estimate a future change in an echo image produced based on the reception signal. The echo image produced based on the reception signal at the N-th scan being a future echo image estimated by the estimation component.

Consequently, since the intermediate image is produced based on the future echo image estimated by the estimation component, the intermediate image can be displayed at an early stage, which makes the display more real-time.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
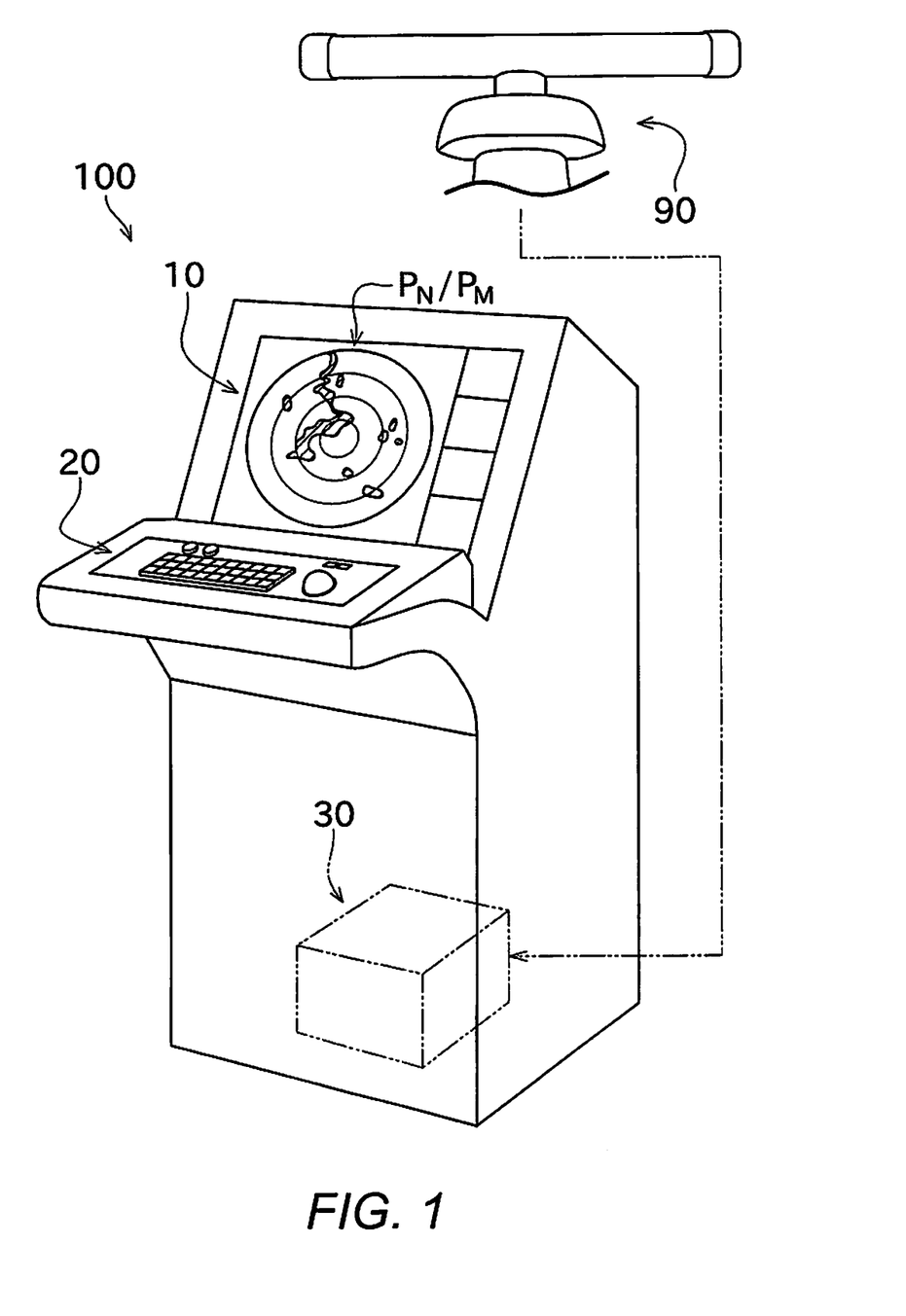
FIG. 1 is a simplified oblique view of the configuration of a radar image display device pertaining to a first embodiment of the present invention.
Figure 2:
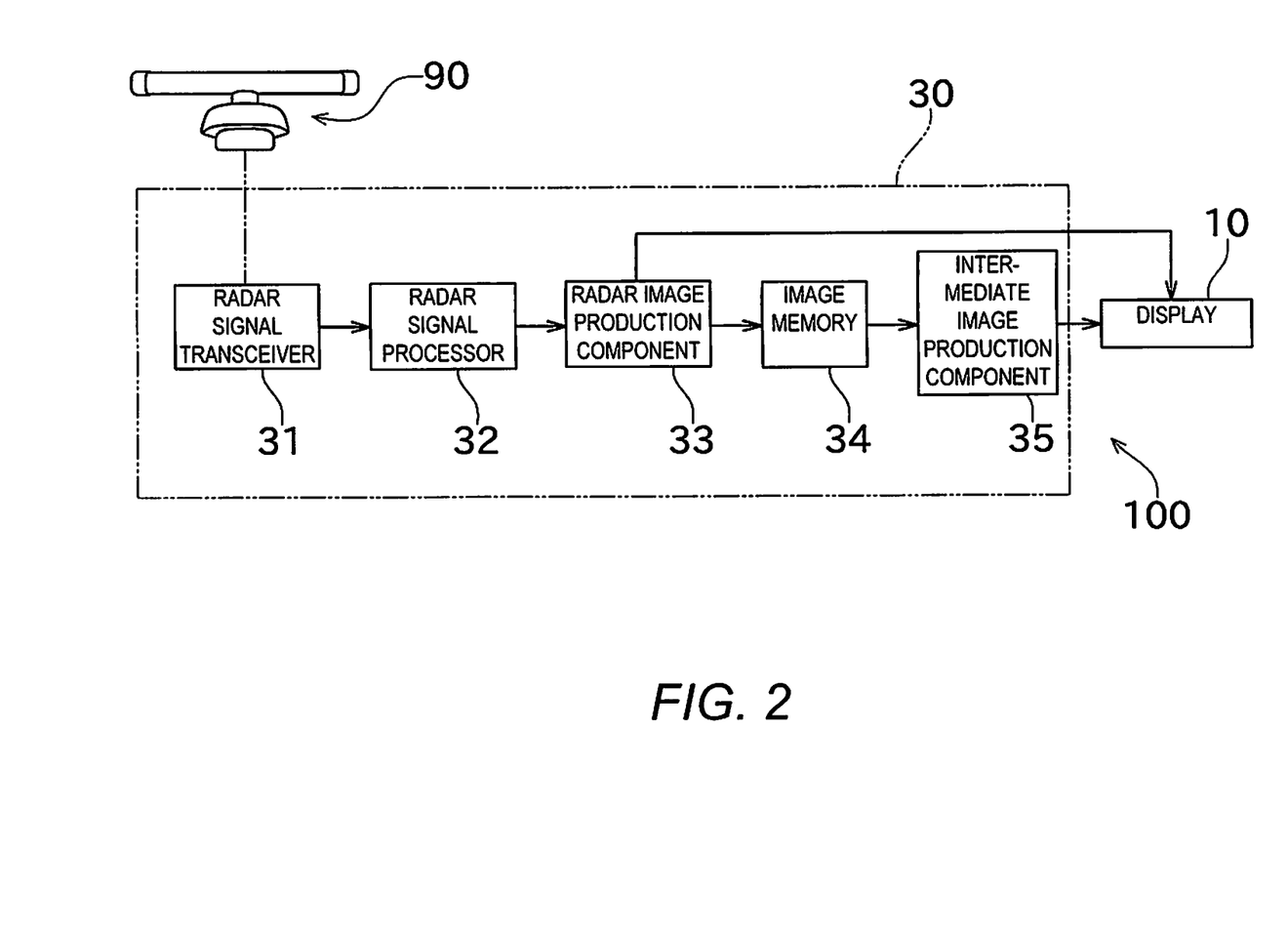
FIG. 2 is a block diagram of the configuration of the radar image display device.

FIG. 1 is a simplified oblique view of the configuration of a radar image display device 100 pertaining to a first embodiment of the present invention. FIG. 2 is a block diagram of the configuration of the radar image display device 100.

The radar image display device (echo image display device) 100 in the first embodiment functions as a display component in a radar device installed on a ship (moving body). This radar image display device 100 is electrically connected to a radar antenna 90, receives reception signals from this radar antenna 90, and can produce and display radar images that reflect the status of a detection object (detection region).

The radar antenna 90 is configured to be able to rotate 360° in a horizontal plane, and detects information about an island, another vessel, or another such target (detection object) around the ship by scanning the surrounding region by transmitting microwaves (electromagnetic waves, etc.) with a short wavelength as a detection signal (transmission signal). More specifically, the radar antenna 90 transmits electromagnetic waves with high directionality, and receives echoes (reflected waves) from targets within the detection region, thereby acquiring information about the targets, and outputs the acquired information to the radar image display device 100.

The radar image display device 100 receives information as a reception signal from the radar antenna 90, finds the distance, size, and azimuth of a target based on the received reception signal, produces a radar image (echo image), and displays this on a display (display component) 10.

As shown in FIG. 1, the radar image display device 100 comprises the display 10, an interface 20, and an information processor 30.

The display 10 is constituted by a liquid crystal display or the like, and can display a radar image in response to a display command from the information processor 30. This radar image is a two-dimensional expression of the position and shape of a detection object in a circular detection region.

The interface 20 is disposed near the display 10, and comprises suitable input members. Examples of input members include a track ball, buttons, and a keyboard, but these are not the only options. The user operates the interface 20 to give various instructions to the radar image display device 100 (such as designating the detection region, or switching between a mode in which an intermediate image (discussed below) is displayed and a mode in which it is not displayed).

As shown in FIG. 2, the information processor 30 comprises a radar signal transceiver (receiver) 31, a radar signal processor 32, a radar image production component 33, an image memory (information memory) 34, and an intermediate image production component 35.

The radar signal transceiver 31 can produce transmission signals (such as electromagnetic waves) at a specific transmission timing and output them to the radar antenna 90. The radar signal transceiver 31 can then input as a reception signal the information from the reflected wave of the detection signal transmitted by the radar antenna 90, and subject this reception signal to amplification, filtering, A/D conversion, etc.

The radar signal processor 32 subjects the reception signal inputted from the radar signal transceiver 31 to pulse compression processing, gain adjustment, processing to remove sea return and the like, scan correlation, and other such processing. The radar signal processor 32 then outputs the reception signal that has undergone signal processing to the radar image production component 33.

The radar image production component 33 is configured to produce a radar image in PPI (plan position indicator) scope format based on the reception signal that has undergone signal processing. The radar image production component 33 acquires the distance to a target based on the time difference between the point at which the radar antenna 90 transmitted the transmission signal and the point at which the reflected wave was received. The radar image production component 33 also acquires the direction in which the target is located based on the orientation of the radar antenna 90 at the point when the transmission signal was transmitted.

Specifically, the radar image produced by the radar image production component 33 includes various kinds of detection information obtained by the transmission and reception of signals. After producing a radar image, the radar image production component 33 outputs that radar image to the image memory 34 and the intermediate image production component 35.

The image memory 34 can store the radar image inputted from the radar image production component 33 for at least the two immediately prior scans. In this Specification, the term "scan" refers to an operation in which the entire detection region is scanned one time. A "scan" in a radar device means an operation in which the radar antenna 90 makes one rotation.

To describe this in more specific terms, every time the radar antenna 90 makes one scan, the radar image production component 33 outputs to the image memory 34 a radar image P produced based on the reception signal received for that scan. Every time a radar image P is inputted from the radar image production component 33, the image memory 34 discards the radar image for the oldest scan from the memory content, and newly stores the inputted radar image. Therefore, if we call the latest scan the N-th scan, the image memory 34 functions as a buffer that always stores a radar image $P_N$ based on the N-th scan and a radar image $P_{N-1}$ based on the N−1-th scan. The image memory 34 can output the stored radar images $P_N$ and $P_{N-1}$ to the intermediate image production component 35 as needed.

In this embodiment, the radar image P defines polar coordinates $(r,\theta)$ centered on the radar antenna 90, and is expressed as a grouping of signal strength data S at these coordinates $(r,\theta)$. The image memory 34 can store the signal strength data (detection information) S in association with the coordinates (position information) at which the signal was acquired.

The intermediate image production component 35 produces an image (intermediate image) for compensating for the interval between the radar images $P_N$ and $P_{N-1}$ based on the two radar images $P_N$ and $P_{N-1}$ inputted from the image memory 34, and outputs this image to the display 10.

As described above, the radar image display device 100 in this embodiment comprises the intermediate image production component 35, and can produce an intermediate image of the radar images $P_N$ and $P_{N-1}$ obtained for two continuous scans, and display this image on the display 10. Consequently, coarse changes in the radar image at each scan can be suppressed, and how the status of the detection region changes can be expressed more smoothly.

Figure 3:
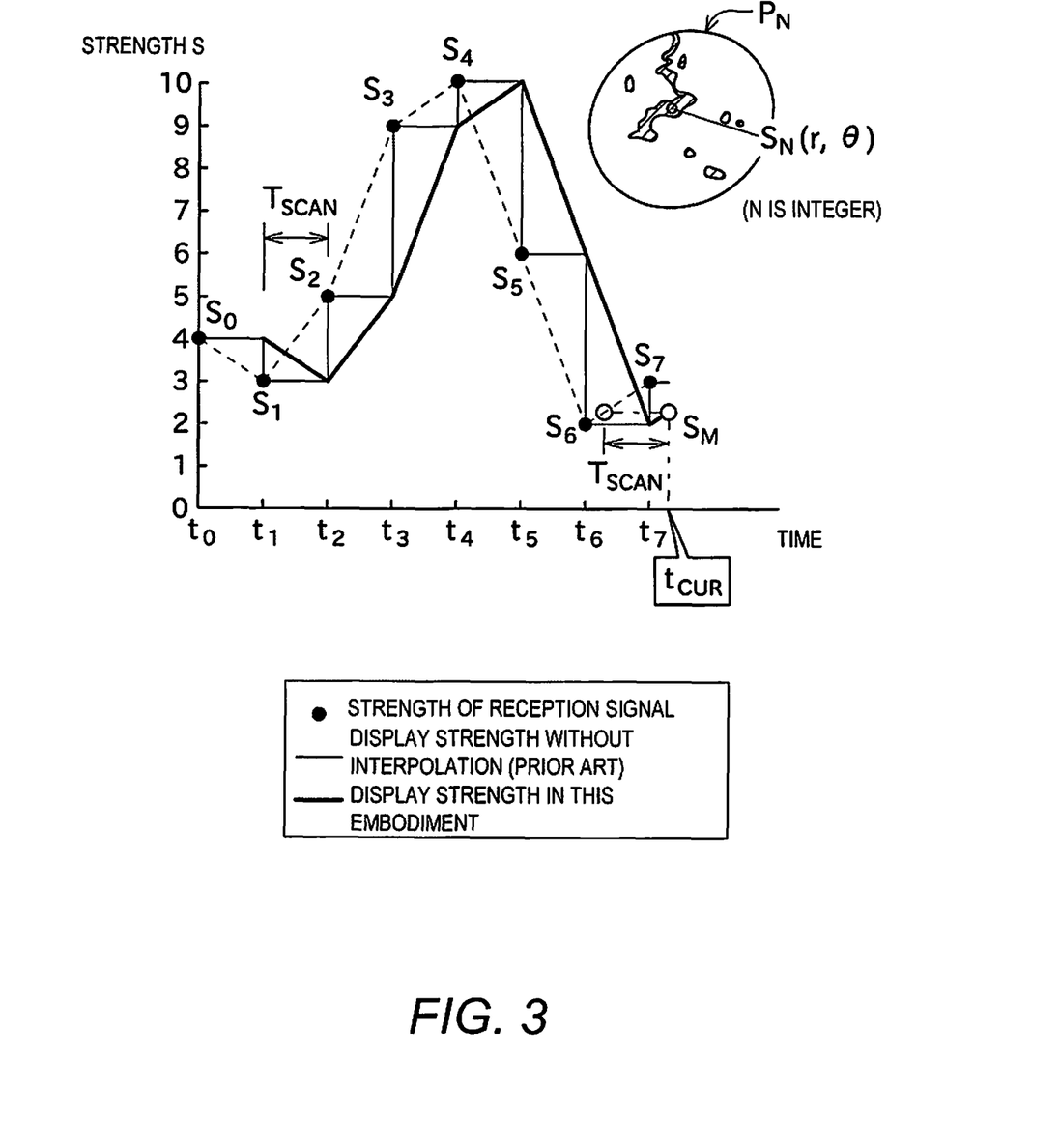
FIG. 3 is a graph of the change in display strength of a radar image at certain positional coordinates.

The graph in FIG. 3 will now be described in detail. FIG. 3 shows the change in display strength of a radar image at certain coordinates $(r,\theta)$, with time plotted on the horizontal axis and display strength (or the actual signal strength) on the vertical axis.

Points $S_0$ to $S_7$ in FIG. 3 are the strength (that is, amplitude) of an actual reception signal at certain coordinates $(r,\theta)$. The strengths $S_0$ to $S_7$ of the reception signal corresponds to radar images $P_0$ to $P_7$. The current time in the graph in FIG. 3 is indicated by $t_{CUR}$, and the strength of the latest reception signal is the strength $S_7$ of the signal included in the radar image $P_7$ based on the seventh scan. Information about the strengths $S_0$ to $S_7$ of the signal is obtained for each scan period $T_{SCAN}$ (discretely), indicated by the times $t_0$ to $t_7$.

With a conventional radar device, the display strength of a radar image at certain coordinates $(r,\theta)$ changes at the point when the sweep line (scan line) that rotates over the radar image passes through the above-mentioned positional coordinates, and does not change at any other point. Therefore, with a conventional radar device, the display strength of a radar image changes intermittently as indicated by the thin line that changes in steps every time one scan period elapses in the graph in FIG. 3.

In this regard, the radar image display device 100 in this embodiment is configured such that the display strength at the current time $t_{CUR}$ at certain coordinates $(r,\theta)$ will be an intermediate signal strength $S_M$ calculated so as to compensated for the interval between the strength $S_7$ based on the latest scan and the strength $S_6$ based on the scan just before that. This intermediate signal strength $S_M$ is calculated so as to exhibit a value close to $S_7$ if the point in time that is one scan period $T_{SCAN}$ in the past from the current time $t_{CUR}$ is closer to the timing of the latest scan (the time $t_7$ at which the signal of $S_7$ was obtained), and to exhibit a value that is close to $S_6$ if this point in time is closer to the timing of the scan just before that (the time $t_6$ at which the signal of $S_6$ was obtained).

To put the above-mentioned processing another way, focusing on the image, the image displayed on the display 10 at the current time $t_{CUR}$ will be an intermediate image $P_M$ calculated so as to compensate for the interval between the radar image $P_7$ based on the latest scan and the radar image $P_6$ based on the scan just before that.

Only one of the radar images $P_0$ to Pi is obtained during one scan period, but as many of the intermediate images $P_M$ can be produced as the calculation load will allow. Therefore, the image refresh time interval can be shorted in the display 10, and the change in the status of the detection region can be expressed as a smooth change in the image.

The specific processing performed by the intermediate image production component 35 will now be described. In this embodiment, the radar image P produced by the radar image production component 33 is represented as a grouping of signal strength data S corresponding to the coordinates $(r,\theta)$ in the above-mentioned polar coordinate system.

If we let $S_N$ be the signal strength obtained in the latest (N-th) scan at certain coordinates $(r,\theta)$, $t_N$ be the time at which this signal strength was obtained, $S_{N-1}$ be the signal strength obtained one scan before (the N−1-th) at the same coordinates $(r,\theta)$, and $t_{N-1}$ be the time at which this signal strength was obtained, the intermediate image production component 35 uses the following formula (1) to find the display strength $S_{CUR}$ (intermediate signal strength $S_M$) at these coordinates at the current time $t_{CUR}$.

[Formula 1]

$$S_{CUR} = S_M = \frac{S_N - S_{N-1}}{t_N - t_{N-1}} \cdot (t_{CUR} - T_{SCAN} - t_{N-1}) + S_{N-1} \quad (1)$$

Here, $T_{SCAN}$ is one scan period.

The intermediate image $P_M$ is obtained by calculating the intermediate signal strength $S_M$ based on this linear interpolation formula for all of the coordinates $(r,\theta)$. The intermediate image $P_M$ thus obtained is then transiently displayed, so that the process by which the status of the detection region changes can be continuously expressed with an ample amount of information.

Figure 4:
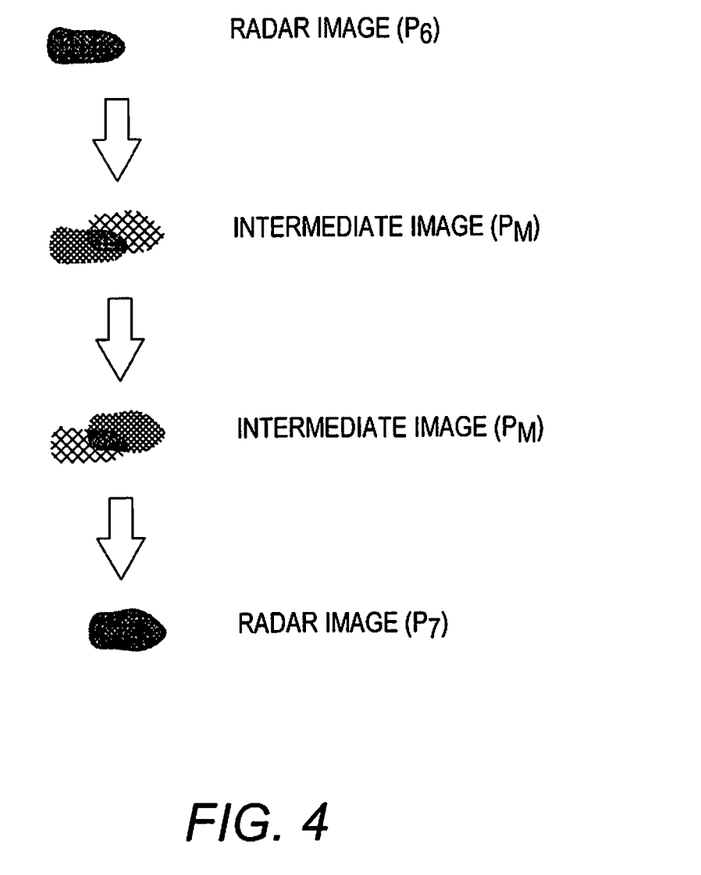
FIG. 4 is a diagram illustrating how an intermediate image is displayed so as to compensate between one radar image and another.

FIG. 4 shows the transition of the display content when two intermediate images are produced and displayed so as to compensate for the interval between two radar images. In FIG. 4, for the sake of explanation of the drawing, the spacing of the hatching decreases as the display strength of the image increases. As shown in FIG. 4, a temporal change in information about the surroundings of the host vessel can be expressed in a natural way by displaying an intermediate image between radar images that are actually acquired. More specifically, since the display content on the display 10 changes smoothly, it is anticipated that movement of another vessel or another such target can be more understood intuitively. Also, the impression that the change in the radar image gives to the user will be more attractive, giving a sense of higher quality.

Linear interpolation is used as the method for producing the intermediate image $P_M$ in this embodiment. This allows the calculation processing to be simplified. However, the configuration may, for example, be such that three or more radar images (in other words, the signal strength $S_N$ at the latest scan, the signal strength $S_{N-1}$ at the scan just before that, and the signal strength $S_{N-2}$ two scans before that) can be stored in the image memory 34, and curve interpolation (such as interpolation with a quadratic curve) may be performed based on these radar images. In this case, an even more natural change in the display content can be achieved.

Also, the motion vector of a block (target) can be calculated by block matching, and the intermediate image (interpolation image) $P_M$ can be produced based on the calculated motion vector (motion vector interpolation). Since motion vector interpolation is well known, it will not be described in detail herein. This configuration allows a change in the situation surrounding the host vessel to be expressed more naturally.

The intermediate image $P_M$ need not be produced for the entire detection region. For instance, if a certain partial region is designated and the radar image is displayed in a separate window, the production and display of the intermediate image $P_M$ may be performed for just this partial region. In this case, the image memory 34 can be configured to store the radar images $P_N$ and $P_{N-1}$ for the above-mentioned partial region.

With the configuration in this embodiment, as understood from that there is a term $-T_{SCAN}$ in the formula (1) above, there is a time lag equivalent to one scan interval until a change in the surrounding situation is reflected in a change in the radar image (see the thick line in the graph in FIG. 3). For example, if the rotational speed of the radar antenna 90 is 24 rpm, then one scan interval $T_{SCAN}$ is 2.5 seconds, so the time lag would not generally be considered a major problem, but a situation in which this would not be acceptable is conceivable.

In this respect, with the radar image display device 100 in this embodiment the user can operate the interface 20 to switch between a mode in which this intermediate image is displayed and a mode in which the intermediate image is not displayed. In the mode in which the intermediate image is not displayed, the image produced by the radar image production component 33 shown in FIG. 2 is outputted directly to the display 10. With this configuration, if particular importance is placed on having the radar image be real-time, the user can switch to the mode in which the intermediate image is not displayed, so that the display will be suited to the situation.

As described above, the radar image display device 100 in this embodiment comprises the radar signal transceiver 31, the image memory 34, the intermediate image production component 35, and the display 10. The radar signal transceiver 31 receives a reception signal produced when a transmitted signal is reflected. The image memory 34 stores the strength S of the reception signal received by the radar signal transceiver 31 in association with the coordinates (r,θ) indicating the position of the reception signal. The intermediate image production component 35 produces the intermediate image $P_M$ based on at least the strength $S_N$ of the reception signal received at the N-th scan, and the strength $S_{N-1}$ of the reception signal received at the N−1-th scan having the same coordinates (r,θ) as the coordinates (r,θ) of the reception signal. The display 10 displays the intermediate image $P_M$ produced by the intermediate image production component 35.

Consequently, by producing the intermediate image $P_M$ separately from the radar images $P_N$ and $P_{N-1}$ produced based on the received reception signals, an image can be obtained that reflects information about the detection object (detection region). Therefore, with the above configuration, a change in the information about the detection object (detection region) can be expressed with an ample amount of information.

Figure 5:
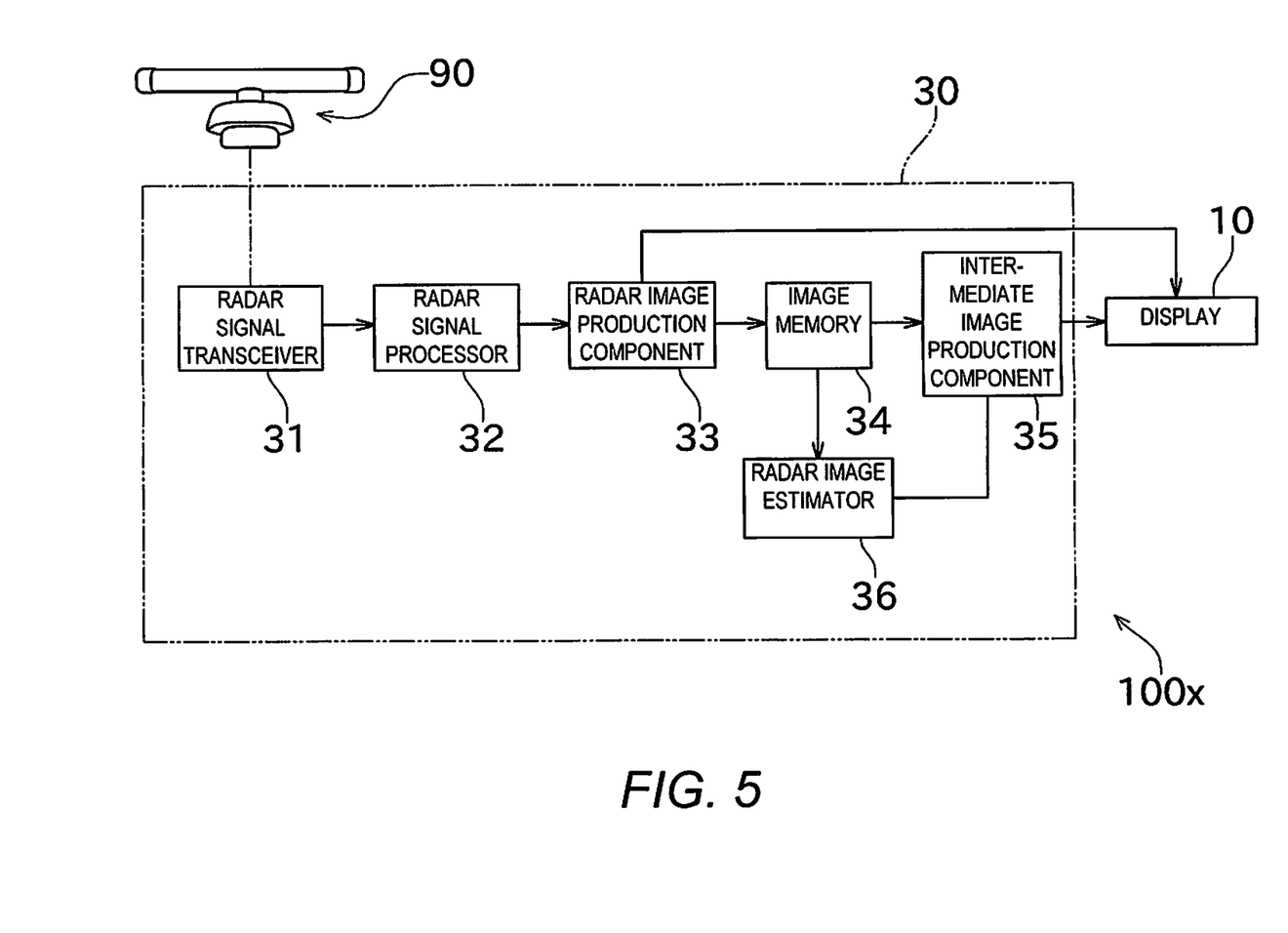
FIG. 5 is a block diagram of the configuration of the radar image display device pertaining to a second embodiment.

A second embodiment will now be described. FIG. 5 is a block diagram of the configuration of the radar image display device 100x pertaining to the second embodiment. In the description of this embodiment, those members that are the same as or analogous to the embodiment given above will be numbered the same in the drawings, and may not be described again.

As shown in FIG. 5, the radar image display device 100x in this embodiment comprises a radar image estimator 36. The radar image estimator 36 uses a plurality of radar images stored in the image memory 34 (the radar image based on the latest scan, and the radar image based on the scan just before that) to estimate by calculation the radar image that will be obtained in the next scan. This estimation can be accomplished in a variety of ways, but estimation by linear approximation can be used, for example.

In the description of this embodiment, the next (future) scan is called the N-th scan. Therefore, the latest scan for which a radar image has already been obtained corresponds to the N−1-th scan, and the scan just before that corresponds to the N−2-th scan.

The radar image $P_N$ (the radar image for the next scan) estimated by the radar image estimator 36 is outputted to the intermediate image production component 35. The intermediate image production component 35 produces the intermediate image $P_M$ so as to compensate for the interval between the radar image $P_N$ obtained by estimation and the radar image $P_{N-1}$ obtained in the latest scan, and displays the result. Consequently, the lag equal to one scan period in the first embodiment above is eliminated, so the intermediate image $P_M$ can be displayed earlier, making the display of the radar image more real-time.

A number of preferred embodiments of the present invention were described above, but the above configuration can be modified as follows, for example.

In the above embodiment, the switching between a mode in which the intermediate image is displayed and a mode in which it is not displayed is performed by user input. However, the configuration may be such that if the speed of the host vessel is above a certain value, for example, or if it is detected that the target is approaching the host vessel, the system automatically switches from a mode in which the intermediate image is displayed to a mode in which it is not displayed.

The polar coordinates (r,θ) were used in the above embodiments as the coordinates used for producing the intermediate image, but some other coordinates may be used instead (such as a rectangular coordinate system (X,Y)).

The intermediate image need not be just simply displayed on the display 10, and can also be used for target tracking (TT), which is a known technique for detecting the movement of a target, for example.

Some other method may be used to produce the intermediate image (such as a known image processing method called morphing).

With a Doppler radar in which the movement speed of a target is acquired by utilizing the Doppler effect, an intermediate image may be produced in order to compensate for the interval between radar images expressing the Doppler speed, which is detection information.

In the above embodiment, a rotating sweep line is not displayed on the display 10 because the image changes smoothly. However, the configuration can be such that a sweep line is displayed on the display 10.

The radar can also be installed in a moving body other than a ship, and can be installed in something other than a moving body (such as a building).

The present invention is not limited to a device for displaying the echo images of a radar. For instance, it can also be applied to a device for displaying echo images in sonar, which detects objects in the water by using sound waves.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An echo image display device comprising:
   a receiver configured to receive a reception signal that is a reflection of a transmitted signal;
   an information memory configured to store detection information about the reception signal received by the receiver and position information about the reception signal in association with each other;
   processing circuitry configured to produce an intermediate image based on at least the detection information for the reception signal at a current scan, and the detection information for the reception signal at a previous scan having the same position information as the position information for the reception signal at the current scan; and
   a display that displays the intermediate image produced by the processing circuitry after displaying a previous echo image based on the reception signal at the previous scan and before displaying a current echo image based on the reception signal at the current scan.

2. The echo image display device according to claim 1, wherein
   the processing circuitry is configured to produce the intermediate image by linear interpolation using the detection information for the reception signal at the current scan, and the detection information for the reception signal at the previous scan having the same position information as the position information for the reception signal at the current scan.

3. The echo image display device according to claim 2, wherein
   the information memory is configured to store the position information and the detection information for a specific detection region, and
   the processing circuitry is configured to produce the intermediate image for the detection region every time the entire detection region is scanned.

4. The echo image display device according to claim 3, wherein
   the processing circuitry is configured to produce multiple intermediate images based on at least the detection information for the reception signal at the current scan, and the detection information for the reception signal at the previous scan having the same position information as the position information for the reception signal; and
   the display displays the multiple intermediate images produced by the processing circuitry after displaying a previous echo image based on the reception signal at the previous scan and before displaying a current echo image based on the reception signal at the current scan.

5. The echo image display device according to claim 2, further comprising
   an estimator configured to estimate a future change in an echo image produced based on the reception signal,
   the echo image produced based on the reception signal at the current scan being a future echo image estimated by the estimator.

6. The echo image display device according to claim 2, wherein
   the processing circuitry is configured to produce multiple intermediate images based on at least the detection information for the reception signal at the current scan, and the detection information for the reception signal at the previous scan having the same position information as the position information for the reception signal; and
   the display displays the multiple intermediate images produced by the processing circuitry after displaying a previous echo image based on the reception signal at the previous scan and before displaying a current echo image based on the reception signal at the current scan.

7. The echo image display device according to claim 1, wherein
   the processing circuitry is configured to produce the intermediate image by curve interpolation using at least the detection information for the reception signal at the current scan, the detection information for the reception signal at the previous scan having the same position information as the position information for the reception signal at the current scan, and the detection information for the reception signal at a scan before the previous scan having the same position information as the position information for the reception signal at the current scan.

8. The echo image display device according to claim 7, wherein
   the information memory is configured to store the position information and the detection information for a specific detection region, and
   the processing circuitry is configured to produce the intermediate image for the detection region every time the entire detection region is scanned.

9. The echo image display device according to claim 7, further comprising
an estimator configured to estimate a future change in an echo image produced based on the reception signal,
the echo image produced based on the reception signal at the current scan being a future echo image estimated by the estimator.

10. The echo image display device according to claim 7, wherein
the processing circuitry is configured to produce multiple intermediate images based on at least the detection information for the reception signal at the current scan, and the detection information for the reception signal at the previous scan having the same position information as the position information for the reception signal; and
the display displays the multiple intermediate images produced by the processing circuitry after displaying a previous echo image based on the reception signal at the previous scan and before displaying a current echo image based on the reception signal at the current scan.

11. The echo image display device according to claim 1, wherein
the processing circuitry is configured to produce the intermediate image based on at least a motion vector estimating a motion of an image between an echo image produced based on the reception signal at the current scan and an echo image produced based on the reception signal at the previous scan.

12. The echo image display device according to claim 11, wherein
the information memory is configured to store the position information and the detection information for a specific detection region, and
the processing circuitry is configured to produce the intermediate image for the detection region every time the entire detection region is scanned.

13. The echo image display device according to claim 11, further comprising
an estimator configured to estimate a future change in an echo image produced based on the reception signal,
the echo image produced based on the reception signal at the current scan being a future echo image estimated by the estimator.

14. The echo image display device according to claim 11, wherein
the processing circuitry is configured to produce multiple intermediate images based on at least the detection information for the reception signal at the current scan, and the detection information for the reception signal at the previous scan having the same position information as the position information for the reception signal; and
the display displays the multiple intermediate images produced by the processing circuitry after displaying a previous echo image based on the reception signal at the previous scan and before displaying a current echo image based on the reception signal at the current scan.

15. The echo image display device according to claim 1, wherein
the information memory is configured to store the position information and the detection information for a specific detection region, and
the processing circuitry is configured to produce the intermediate image for the detection region every time the entire detection region is scanned.

16. The echo image display device according to claim 15, further comprising
an estimator configured to estimate a future change in an echo image produced based on the reception signal,
the echo image produced based on the reception signal at the current scan being a future echo image estimated by the estimator.

17. The echo image display device according to claim 15, wherein
the processing circuitry is configured to produce multiple intermediate images based on at least the detection information for the reception signal at the current scan, and the detection information for the reception signal at the previous scan having the same position information as the position information for the reception signal; and
the display displays the multiple intermediate images produced by the processing circuitry after displaying a previous echo image based on the reception signal at the previous scan and before displaying a current echo image based on the reception signal at the current scan.

18. The echo image display device according to claim 1, further comprising
an estimator configured to estimate a future change in an echo image produced based on the reception signal,
the echo image produced based on the reception signal at the current scan being a future echo image estimated by the estimator.

19. The echo image display device according to claim 18, wherein
the processing circuitry is configured to produce multiple intermediate images based on at least the detection information for the reception signal at the current scan, and the detection information for the reception signal at the previous scan having the same position information as the position information for the reception signal; and
the display displays the multiple intermediate images produced by the processing circuitry after displaying a previous echo image based on the reception signal at the previous scan and before displaying a current echo image based on the reception signal at the current scan.

20. The echo image display device according to claim 1, wherein
the processing circuitry is configured to produce multiple intermediate images based on at least the detection information for the reception signal at the current scan, and the detection information for the reception signal at the previous scan having the same position information as the position information for the reception signal; and
the display displays the multiple intermediate images produced by the processing circuitry after displaying a previous echo image based on the reception signal at the previous scan and before displaying a current echo image based on the reception signal at the current scan.

* * * * *